Figure 1:
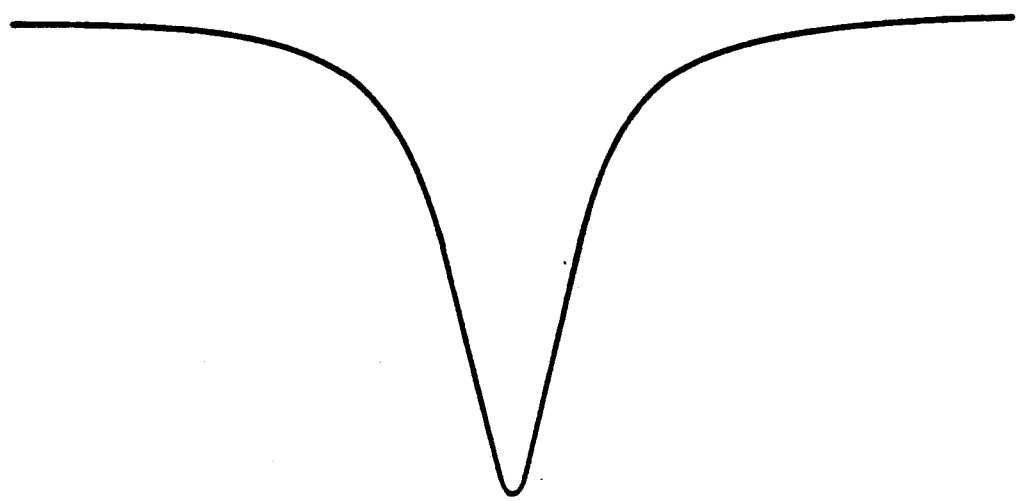

United States Patent [19]
Malvern

[11] Patent Number: 5,090,810
[45] Date of Patent: Feb. 25, 1992

[54] RING RESONATOR GYROSCOPE CONTROLLING TWO SERVO CONTROL LOOPS BASED ON THE OUTPUT OF A SINGLE INTERFERENCE DETECTOR

[75] Inventor: Alan R. Malvern, Plymouth, United Kingdom

[73] Assignee: British Aerospace Public Limited Company, London, England

[21] Appl. No.: 510,215

[22] Filed: Apr. 18, 1990

[30] Foreign Application Priority Data

Apr. 19, 1989 [GB] United Kingdom ............... 8908910
Aug. 14, 1989 [GB] United Kingdom ............... 8918501

[51] Int. Cl.⁵ ............................................. G01C 19/72
[52] U.S. Cl. .................................................. 356/350
[58] Field of Search ........................... 356/350; 372/94

[56] References Cited

U.S. PATENT DOCUMENTS 4,825,261 4/1989 Schroeder .......................... 356/350

FOREIGN PATENT DOCUMENTS 0104942 4/1984 European Pat. Off. ............. 372/94
0254756 2/1988 United Kingdom ............... 356/350

Primary Examiner—Samuel Turner
Attorney, Agent, or Firm—Cushman, Darby & Cushman

[57] ABSTRACT

A ring resonator fibre optic gyro includes a single detector on which the clockwise and counter-clockwise beams interfere on leaving the ring. The output of the detector is used by a first and a second servo loop to compensate for optical path length changes and for rotation of the gyro respectively.

8 Claims, 3 Drawing Sheets

INTENSITY AS A FUNCTION OF TUNING (NO RATE)

INTENSITY AS A FUNCTION OF TUNING (NO RATE)

INTENSITY AS A FUNCTION OF RATE (TUNED TO LINE CENTRE)

INTENSITY AS A FUNCTION OF RATE (WITH DETUNING)

RING RESONATOR GYROSCOPE CONTROLLING TWO SERVO CONTROL LOOPS BASED ON THE OUTPUT OF A SINGLE INTERFERENCE DETECTOR

This invention relates to a ring resonator gyro.

A typical example of a ring resonator gyro has a fibre coil which may be 5-10 meters in length. Light is injected into the coil in clockwise (CW) and counterclockwise (CCW) directions and the CW and CCW beams typically will go around the loop many times before being transmitted or lost. The repeated passage of the CW and CCW beams around the coil increases the effective length of the coil by typically 100 times. The transmitted intensity I(δ) of the resonator has a marked dip at resonance and can be written as:

$$I(\delta) = 1 - \frac{C}{1 + F\sin^2\frac{\delta}{2}} \quad (1)$$

where
$C = (1-r^2)\cdot(1-\gamma^2)/(1-\gamma r)^2$
and $F = 4\gamma r/(1-\gamma r)^2$
where
δ = phase offset from resonance
γ = transmitted amplitude around the resonator
r = reflectance of the coupler If the gyro is rotated about the axis of the coil, a rotation-induced non-reciprocal phase shift will be applied to the CW and CCW beams of magnitude and sense dependent on the magnitude and sense of the applied rotation. The non-reciprocal phase shift will move both of the CW and CCW beams in opposite senses away from resonance. Resonance is restored in both beams by changing their relative frequencies so as to apply a non-reciprocal phase shift which compensates the non-reciprocal phase shift induced by rotation. The difference between the frequencies of the CW and CCW beam is related to the applied rotation rate.

Other factors besides the applied rotation rate may move the beams away from resonance. In particular a change in the path length of the coil has the effect of applying a reciprocal phase shift to the CW and CCW beams which moves both away from resonance in the same sense. It is important that the path length be controlled to keep the beams at resonance and this is typically done by stressing the coil using a piezo electric transducer.

In the past, the relative frequencies of the beams and the amount of stress applied to maintain the beams at resonance have been controlled by separately monitoring the intensity of the CW and CCW beams by means of two separate photodetectors. Typically the detected intensity of one beam (e.g. CW) has been used to adjust the length of the fibre optic coil to bring the CW beam to resonance. The detected intensity of the other beam is used to determine the frequency difference and hence phase change to be applied to bring that beam to resonance.

The comparison of the resonance positions for two signal is beset by problems as the matching of the two photodetectors is critical. In practise it is necessary to have the relative resonance positions matched to about $10^{-6}$ to $10^{-7}$ of a halfwidth of the resonance. In practise it is difficult to get the phase shift applied to the CCW beam to be closer than $10^{-3}$ to $10^{-4}$ of a halfwidth with respect to that required for the resonance. The other direction then needs to be matched to the offset defined by this error to about one part in $10^{-3}$. It is an aim of this invention to at least mitigate some of these problems.

According to one aspect of this invention, there is provided a ring resonator gyro in which, in use, the CW beam and the CCW beam interfere on a detector after leaving the ring.

The disclosed embodiment is believed to facilitate a considerable improvement in the common mode rejection ratio since a single detector is used and the CW and CCW beams each pass through the same components (albeit in different directions) so the optical reciprocity is improved compared to the earlier techniques. Also, the use of relative phase information rather than separately monitoring the beam intensities is believed intrinsically to provide better accuracy.

Figure 2:
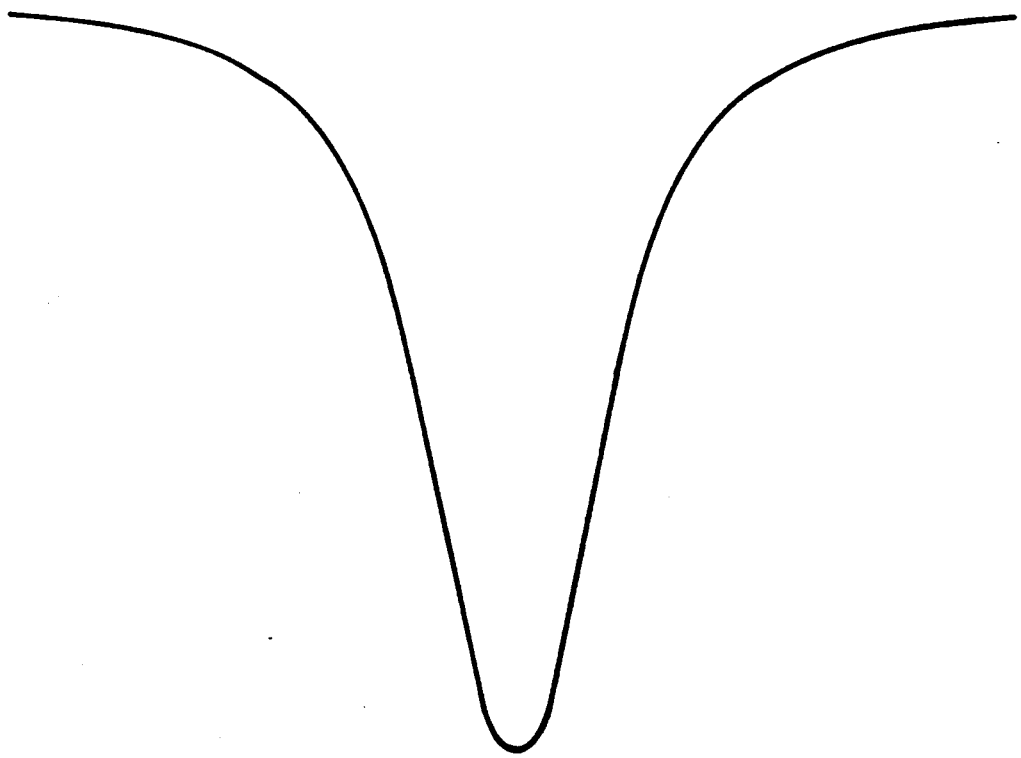
Figure 3:
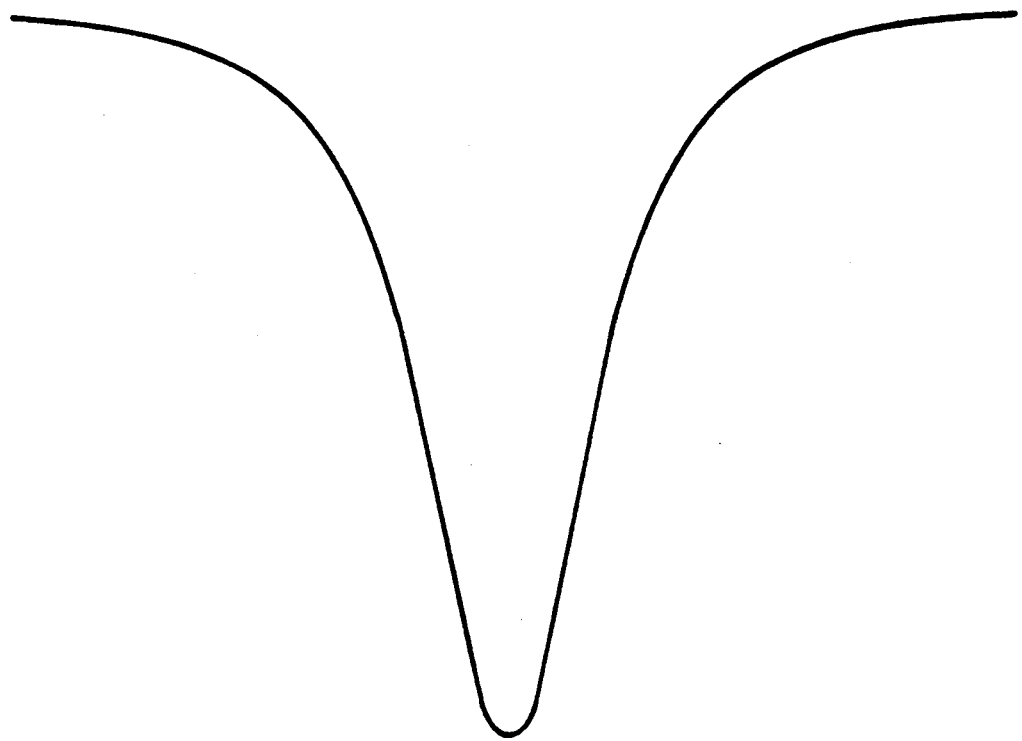
Figure 4:
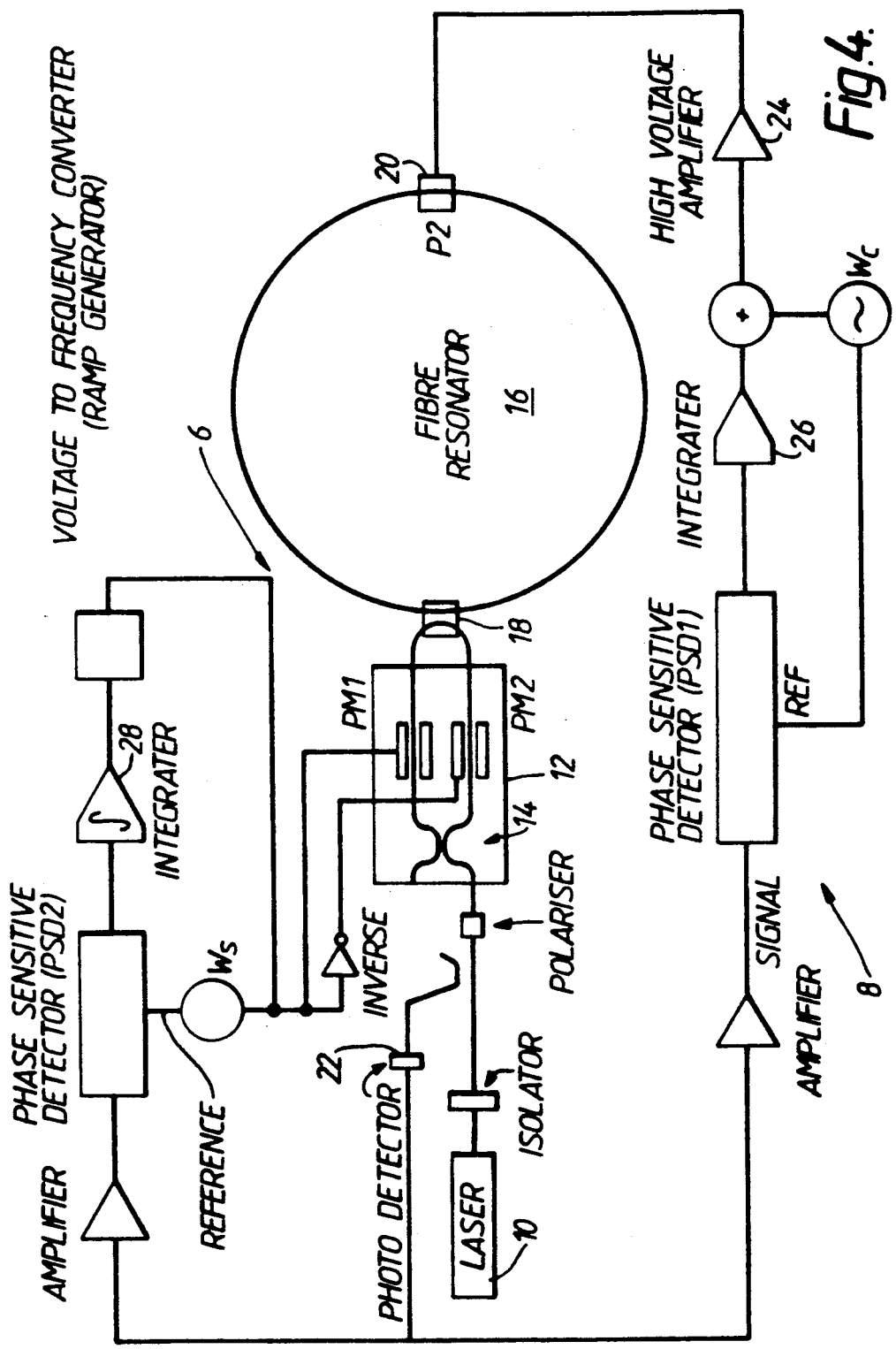

The invention may be performed in various ways and an embodiment thereof will now be described by way of example, reference being made to the drawings, in which:

FIG. 1 is a graph showing the intensity of one beam as a function of tuning for a typical ring resonator gyro where there is no applied rate;

FIG. 2 is a graph showing the intensity of the signal generated by interfering the CW and CCW beams as a function of rate where the mean path length is on resonance FIG. 3 is a graph showing intensity as a function of rate where there is slight detuning or offset (i.e. where the mean path length is not quite right for resonance), and FIG. 4 is a schematic diagram of a ring resonator gyro in accordance with the invention.

The embodiment of ring resonator to be described with reference to FIG. 4 causes the CW and CCW beams to interfere at a single sensor, to provide relative phase information, instead of separately detecting the intensities of the CW and CCW beams as in the earlier proposal mentioned above. The relative phase information is then used by two servo loops, one to maintain path length control to keep the CW and CCW beams at resonance when there is no applied rate, and the other to adjust the differential frequency applied to the CW and CCW beams to compensate for the non-reciprocal phase shift induced by rotation.

The intensity variations of the CW and CCW beams and the resultant beam formed by interference of the CW and CCW beams will first be discussed with general principles of operation and there then follows a description of the embodiment illustrated in FIG. 4. The transmitted intensity for each single beam of the ring resonator gyro as a function of tuning is given by general formula I above and a typical graph is shown in FIG. 1.

FIG. 2 shows the typical intensity variation of the resultant signal generated by interfering the CW and CCW beams, as a function of the non-reciprocal phase shift induced by rotation of a gyro. An intensity minimum is obtained that is slightly broader than the single beam intensity that is normally derived. FIG. 2 has been derived on the assumption that the mean path length is on resonance. For a small offset (i.e. a path length error when the fibre length is not quite right for resonance) a graph as in FIG. 3 is obtained. It is important to note that the curve is still symmetrical with a minimum at zero rate so that signal processing means may be applied to lock onto this minimum, as a separate task to the path length control. In one case the non-reciprocal path length is adjusted to obtain a minimum (i.e. to compensate for the rotation induced non-reciprocal phase shift) and in the other case the reciprocal path length is adjusted, (i.e. to compensate for the reciprocal phase shift induced by path length variation). For no applied rate, the intensity $I_i$ of the interfered CW and CCW beams is given by:

$$I_i = 4\left(1 - \frac{C}{1 + F\sin^2(\delta/2)}\right)$$

This is the tuning curve by which the reciprocal path length is adjusted, again for a minimum of intensity and is the same as in FIG. 1. In order for two servoes to separately find a minimum from the same curve at the same time two separate dither frequencies are applied and synchronous detection applied at each. The synchronous detectors each act as a narrowband filter with other frequencies only acting as a noise input. By appropriate choice of the two dither frequencies the one servo should not affect the other.

Referring now to FIG. 4, light from a narrow band laser source 10 is transmitted by means of a fibre to an integrated optics chip 12. On this chip 12 is a coupler 14 which splits the light into two equal parts. The light is then transmitted through two phase modulators PM1 (going counterclockwise into the resonator ) and PM2 going clockwise). The light then is transmitted by the two fibre tails to the fibre resonator loop 16. A coupler 18 with the typical parameters $\gamma = r = 0.97$ will set the resonator finesse and performance.

The resonator gyro includes a first servo 8 which maintains path length control using a piezo element 20 within the fibre loop. The piezo element applies an alternating length change at a first dither frequency $\omega_c$ onto the resonator giving rise to equal (i.e. reciprocal) phase changes in the same sense to the CW and CCW beams. In this way the curve plotted in FIG. 1 is scanned in synchronism. A sine wave at frequency $\omega_c$ is applied to the piezo element 20 and thus, when the resonator is mistuned on the right hand side of the resonance, the light intensity variation at a frequency $\omega_c$ will be in phase and correspondingly out of phase on the left-hand side of the resonance. The output intensity detected by a photodetector 22 which supplies signals to first and second phase sensitive detectors PSD1 and PSD2 respectively. The voltage out of the phase sensitive detector PSD1 will be proportional to the offset from line centre and forms the servo error signal for the path length control. This error signal is applied along with the modulation at $\omega_c$ to the piezo element 20 through a high voltage amplifier 24. An integrator 26 is used to ensure that in the absence of an error signal the correct voltage for resonance is applied to the piezo element 20. In this way the path length is maintained on resonance by applying reciprocal phase shifts to the CW and CCW beams.

Instead of stressing the fibre using the piezo element 20, an alternative is to apply the error signal to adjust the source frequency by adjustment of the laser operating current if a semiconductor laser is used.

A second servo 6 operates to set the differential path length equal. This is achieved by varying the frequency in using a serrodyne frequency shifting element. A sawtooth (serrodyne) voltage is applied in anti phase to the phase modulators PM1 and PM2 to give a peak differential phase of $2\pi$. The voltage is then reset quickly to zero and the effect is the same as a steady phase ramp with time, i.e. a frequency shift given by $d\phi/dt$. By adjusting the differential frequency both directions equal and opposite phase shifts are applied to the CW and CCW beams to compensate for the non-reciprocal phase shift induced by rotation.

The effect of the path length control servo 8 is to try to apply equal phase shifts to the CW and CCW beams to try and keep each beam at resonance, although this can never be exactly achieved.

The second servo 6 operating the serrodyne frequency shifter comprises a sine wave carried at a dither frequency $\omega_c$ applied to PM1 and PM2 differentially as before. This gives an alternating differential path length so that equal and opposite phase shifts are applied to the CW and CCW beams. This is synchronously detected from the light onto the photodetector 20, through an amplifier using the phase sensitive detector PSD2. The voltage output is used to adjust the ramp rate of the serrodyne modulator (i.e. it adjusts the differential frequency). Again an integrator 28 is used so that under steady state conditions when there is no error signal the correct frequency shift is maintained. The differential frequency shift applied by PM1 and PM2 is directly related to the applied rotation by the scale factor of the gyro. Thus, by detecting the period of the serrodyne waveform the applied rotation rate can be determined.

The use of a sine wave at frequency $\omega_s$ means that there are no components at $\omega_c$ to affect the operation of the path length servo 18. The phase sensitive detector PSD2 is in this case looking for a signal at $\omega_s$ in the same way as the path length control servo 8. If the ramp duration is too short (too high a frequency) the phase of the signal at $\omega_s$ will cause an error signal onto the phase modulators to slow the ramp, and vice versa.

When the path length servo 8 is operating correctly there is a large signal at $2\omega_s$ and $2\omega_c$ on the photodetector. These signals do not affect the differential path length servo operation or the path length servo as long as $\omega_c$ and $\omega_s$ are not harmonically related.

In this way the two servoes operate using the same photodetector completely independently. In this case there is very good common mode rejection when the phase on PM1 is equal and opposite to the phase on PM2 as contrasted to the case when the intensities on two separate photodetectors were compared in the above mentioned earlier proposal. Although the differential phase intensity curves (FIGS. 2 and 3) are slightly broader than the single beam intensity curve (FIG. 1) the exact matching of the two directions still represents a significant improvement. The sharpness of the interferometer output still improves as the finesse of the resonator improves giving the advantage of a shorter length of fibre for the same effective path length compared to a fibre optic gyro. The single resonance centred about zero rate means that there is no ambiguity of fringe number as can occur with the fibre optic gyro. The nearest resonance of a different order will be a mode spacing away (typically 20 MHz) which corresponds to an unrealistically high rotation rate. A second advantage is the much higher power onto the photodetector by virtue of the use of a laser source compared to the more commonly used broad band source of a fibre optic gyro. This gives rise to a much reduced gyro random noise, going as the inverse square root of the incident power. The effects of backscatter are suppressed by virtue of the anti phase modulation at $\omega_s$ on the two phase modulators. The back reflections into the laser source are suppressed by means of an optical isolator to prevent disruption of its operation.

The reciprocal configuration will be used, whereby the photodetector is in the same input lead to the interferometer as the laser source. This ensures that both directions around the interferometer suffer the same passage through the 50:50 beam splitter, with each having a reflection and a transmission. As there will be in general a different phase shift for these two (reflection and transmission) the reciprocal configuration should ensure that no gyro bias results.

I claim:

1. A ring resonator gyro comprising:
   a resonator ring;
   means for introducing into said ring a clockwise and a counterclockwise beam;
   means for extracting from said resonator ring a clockwise and a counterclockwise beam component;
   a single detector, receiving said clockwise and counterclockwise beam components from said retracting means, within which said beam components interfere;
   first control means responsive to an output of said detector for compensating for variations in optical path length, said first control means including means for applying a reciprocal phase shift to said clockwise and counterclockwise beams, means for modulating said reciprocal phase shift at a first modulation frequency, and means for demodulating the output of said detector in accordance with said first modulation frequency to derive a control signal for controlling said reciprocal phase shift applying means; and
   second control means responsive to the output of said detector for compensating for rotation of the gyro, said second control means including means for applying a non-reciprocal phase shift to said clockwise and counterclockwise beams, means for modulating said nonreciprocal phase shift at a second modulation frequency, and means for demodulating the output of said detector in accordance with said second modulation frequency to derive a control signal for controlling said non-reciprocal phase shift applying means.

2. A ring resonator gyro according to claim 1, wherein said reciprocal phase shift applying means comprises means for varying the optical path length of the resonator ring.

3. A ring resonator gyro according to claim 2, wherein said means for varying the optical path length of the resonator ring comprises a transducer for varying the length of the ring.

4. A ring resonator gyro according to claim 1, wherein said reciprocal phase shift applying means comprises means for adjusting the frequency of the clockwise and counterclockwise beams launched into the resonator ring.

5. A ring resonator gyro according to claim 1, wherein said non-reciprocal phase shift applying means comprises means for applying an antiphase frequency shift between the clockwise and counterclockwise beams.

6. A ring resonator gyro according to claim 1, wherein the non-reciprocal phase shift means includes serrodyne frequency shift means.

7. A ring resonator gyro according to claim 1, wherein the first modulation frequency and the second modulation frequency are not harmonically related.

8. A ring resonator gyro according to claim 1 further comprising a synchronous detector for extracting separate signals at said first and second frequencies.

* * * * *